US008135192B2

(12) United States Patent
Matsuzaki et al.

(10) Patent No.: US 8,135,192 B2
(45) Date of Patent: Mar. 13, 2012

(54) IMAGE PROCESSING APPARATUS AND IMAGE PROCESSING METHOD

(75) Inventors: Hiroshi Matsuzaki, Tachikawa (JP); Yamato Kanda, Hino (JP)

(73) Assignee: Olympus Corporation, Tokyo (JP)

( * ) Notice: Subject to any disclaimer, the term of this patent is extended or adjusted under 35 U.S.C. 154(b) by 336 days.

(21) Appl. No.: 12/417,035

(22) Filed: Apr. 2, 2009

(65) Prior Publication Data

US 2009/0252390 A1 Oct. 8, 2009

Related U.S. Application Data

(63) Continuation of application No. PCT/JP2007/064033, filed on Jul. 13, 2007.

(30) Foreign Application Priority Data

Oct. 2, 2006 (JP) .................................. 2006-271134

(51) Int. Cl.
 *G06K 9/00* (2006.01)
(52) U.S. Cl. ................. 382/128; 382/132; 378/4; 378/8
(58) Field of Classification Search .................. 378/4, 5, 378/8, 98.11, 98.12; 382/128, 130, 131
See application file for complete search history.

(56) References Cited

U.S. PATENT DOCUMENTS

| | | | | |
|---|---|---|---|---|
| 5,195,114 A | * | 3/1993 | Sairenji et al. ................. | 378/40 |
| 5,359,513 A | * | 10/1994 | Kano et al. .................... | 382/128 |
| 5,734,739 A | * | 3/1998 | Sheehan et al. ............... | 382/128 |
| 6,097,833 A | * | 8/2000 | Lobregt et al. ................ | 382/130 |
| 6,233,478 B1 | * | 5/2001 | Liu ............................... | 600/428 |
| 6,442,289 B1 | * | 8/2002 | Olsson et al. ................. | 382/128 |
| 6,501,827 B1 | * | 12/2002 | Takasawa ...................... | 378/116 |
| 2004/0146190 A1 | * | 7/2004 | Kasai ............................ | 382/128 |
| 2004/0249291 A1 | * | 12/2004 | Honda et al. .................. | 600/476 |
| 2004/0258286 A1 | * | 12/2004 | Salla et al. .................... | 382/128 |
| 2006/0189843 A1 | | 8/2006 | Nakamura et al. | |

FOREIGN PATENT DOCUMENTS

| | | |
|---|---|---|
| JP | 2001-054055 | 2/2001 |
| JP | 2001-197405 | 7/2001 |
| JP | 2005-137395 | 6/2005 |

OTHER PUBLICATIONS

Nakamura, English translation of JP 2001-197405, pp. 1-17, 2001.*

* cited by examiner

*Primary Examiner* — Alexander H Taningco
(74) *Attorney, Agent, or Firm* — Scully, Scott, Murphy & Presser, P.C.

(57) ABSTRACT

An image processing apparatus for extracting images from a continuous image sequence includes a storage unit that stores image information about images constituting the image sequence; an image reading unit that reads the image information from the storage unit; and an image change amount calculating unit that calculates a predetermined image change amount between at least two images using the image information read by the image reading unit. The apparatus also includes an image change amount information adding unit that adds information about the image change amount calculated by the image change amount calculating unit to a corresponding image; and an image extracting unit that extracts a preset number of images from the image sequence based on the information added to each image by the image change amount information adding unit.

24 Claims, 10 Drawing Sheets

IMAGE PROCESSING APPARATUS AND IMAGE PROCESSING METHOD

CROSS-REFERENCE TO RELATED APPLICATIONS

This application is a continuation of PCT international application Ser. No. PCT/JP2007/064033 filed on Jul. 13, 2007 which designates the United States, incorporated herein by reference, and which claims the benefit of priority from Japanese Patent Application No. 2006-271134, filed on Oct. 2, 2006, incorporated herein by reference.

BACKGROUND OF THE INVENTION

1. Field of the Invention

The present invention relates to an image processing apparatus, an image processing method, and a computer program product for detecting a position of an image at which a scene changes or a position of a valid image from a sequence of images continuously taken or a sequence of frame images of moving images.

2. Description of the Related Art

Various methods of detecting a position at which a scene changes from a continuous image sequence of, for example, moving images. For example, a method of detection by performing threshold processing on a change in a feature value between images close to each other is generally well known. Japanese Patent Application Laid-open No. 2001-54055 discloses a technology in which, after the number of images to be extracted is appropriately set, the level of importance of a scene contained in each image is obtained, a set number of images are displayed in order from images with higher levels importance and images with higher levels of importance are displayed for a long time. In the conventional technology, a difference between a time at which each scene appears and a time at which the subsequent image appears is obtained as the level of importance, and, the larger the difference is, the higher the level of importance is set.

SUMMARY OF THE INVENTION

An image processing apparatus according to an aspect of the present invention is for extracting images from a continuous image sequence, and includes a storage unit that stores image information about images constituting the image sequence; an image reading unit that reads the image information from the storage unit; an image change amount calculating unit that calculates a predetermined image change amount between at least two images using the image information read by the image reading unit; an image change amount information adding unit that adds information about the image change amount calculated by the image change amount calculating unit to a corresponding image; and an image extracting unit that extracts a preset number of images from the image sequence based on the information added to each image by the image change amount information adding unit.

An image processing apparatus according to another aspect of the present invention is for extracting images from a continuous image sequence, and includes a storage unit that stores image information about images constituting the image sequence; an image reading unit that reads the image information from the storage unit; an image change amount calculating unit that calculates a predetermined image change amount between at least two images using the image information read by the image reading unit; an image change amount information adding unit that adds information about the image change amount calculated by the image change amount calculating unit to a corresponding image; a feature value calculating unit that calculates a feature value of each image contained in the image information read by the image reading unit; and an image extracting unit that extracts an image from the image sequence based on the feature value of each image calculated by the feature value calculating unit and the information added to each image by the image change amount information adding unit.

An image processing method according to still another aspect of the present invention is performed by a computer that enables extracting images from a continuous image sequence and includes a storage unit which stores image information about images constituting the image sequence. The image processing method includes reading the image information from the storage unit; calculating a predetermined image change amount between at least two images using the read image information; adding information about the calculated image change amount to a corresponding image; and extracting a preset number of images from the image sequence based on the information added to each image.

A computer program product according to still another aspect of the present invention causes a computer to perform the method according to the present invention.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Best modes (hereinafter, referred to as "embodiment") for carrying out the present invention are explained below with reference to the accompanying drawings.

First Embodiment

Figure 1:
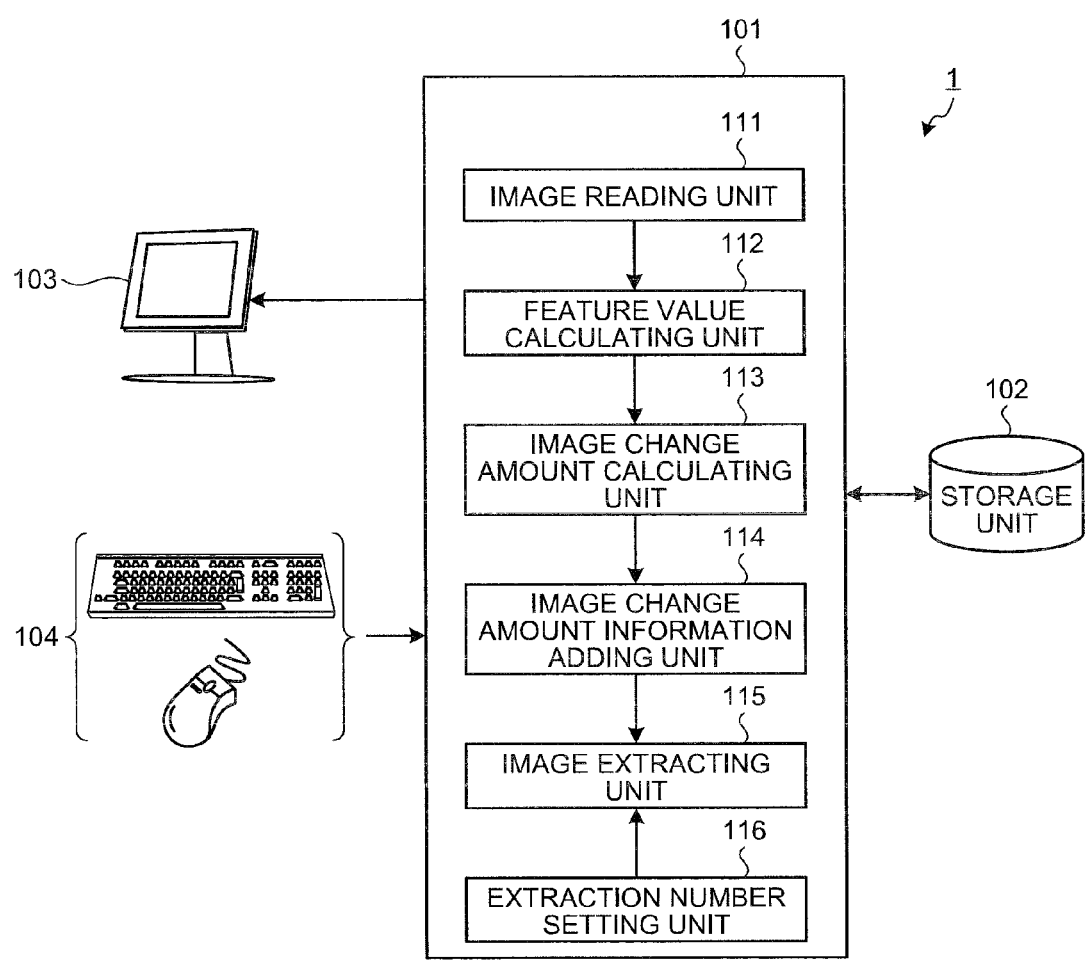
FIG. 1 is a diagram of a configuration of an image processing apparatus according to a first embodiment of the present invention.

FIG. 1 is a diagram of a configuration of an image processing apparatus according to a first embodiment of the present invention. An image processing apparatus 1 shown in FIG. 1 includes a computing unit 101 having a computing function and a controlling function; a storage unit 102 that stores therein various types of information including image information about images constituting a continuous image sequence; a display unit 103 that displays and outputs information containing images; and an input unit 104 such as a keyboard and a mouse. The image processing apparatus 1 is a computer including a CPU, a ROM, a RAM, and the like.

The computing unit 101 includes an image reading unit 111 that reads images constituting a chronologically-continuous image sequence from the storage unit 102; a feature value calculating unit 112 that calculates a feature value of the image read by the image reading unit 111; an image change amount calculating unit 113 that calculate, as an image change amount, a change in the feature value between predetermined images, using the feature values of the images calculated by the feature value calculating unit 112; an image change amount information adding unit 114 that adds information about the image change amount calculated by the image change amount calculating unit 113 to a corresponding image; an image extracting unit 115 that extracts a preset number of images from an image sequence, based on the information added by the image change amount information adding unit 114; and an extraction number setting unit 116 that sets the number of images to be extracted by the image extracting unit 115.

The CPU of the image processing apparatus 1 having the above configuration performs computing processing on an image processing method according to the first embodiment by reading an image processing program for performing the image processing method (explained below). An image processing program according to the first embodiment can be recorded in a computer-readable recording medium such as a flexible disk, a CD-ROM, a DVD-ROM, or a flash memory and widely distributed. In this sense, the image processing apparatus 1 may include an auxiliary storage device that can read any one of the above various types of recording media.

Figure 2:
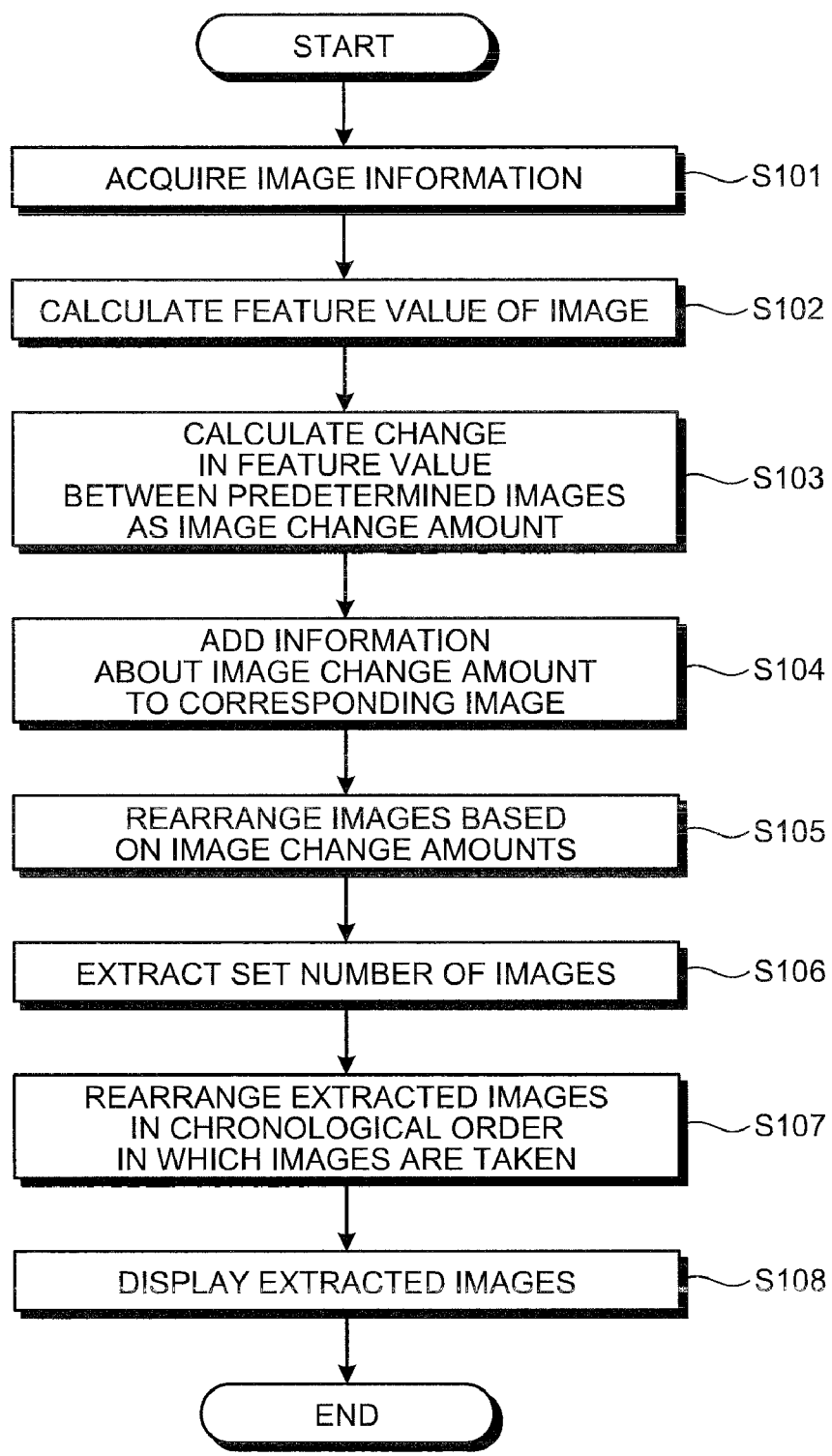
FIG. 2 is a flowchart of an outline of processing of an image processing method according to the first embodiment of the present invention.
Figure 3:
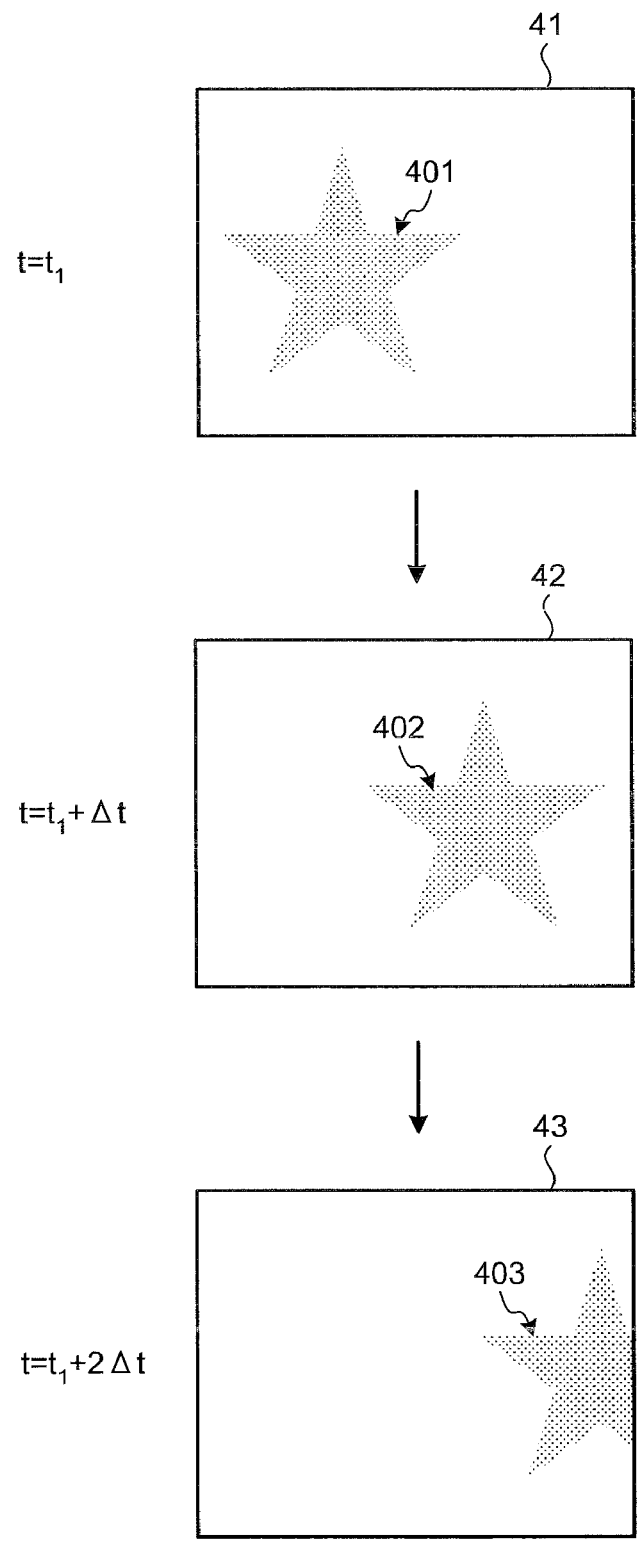
FIG. 3 is a diagram of an example of display of an image sequence.

FIG. 2 is a flowchart of a flow of the processing of the image processing method according to the first embodiment. First, the image reading unit 111 reads and acquires information such as the number of all images constituting an image sequence and an image size (step S101). FIG. 3 is a diagram of an example of an image sequence. In FIG. 3, three images 41 (time $t=t_1$), 42 ($t=t_1+\Delta t$), and 43 ($t=t_1+2\Delta t$) close to one another at time intervals $\Delta t$ contains star-shaped objects 401, 402, and 403, respectively. The objects 401, 402, and 403 are the same object, and FIG. 3 shows the case where the object moves to the right in the horizontal direction in the same visual field at a constant speed.

Subsequently, the feature value calculating unit 112 calculates a feature value of the image (step S102). Thereafter, the image change amount calculating unit 113 calculates, as an image change amount, a change in the feature value between the images chronologically apart from each other at predetermined time intervals (step S103). Information about the image change amount (change in the feature value) obtained at step S103 is added to a corresponding image by the image change amount calculating unit 113 (step S104).

Figure 4:
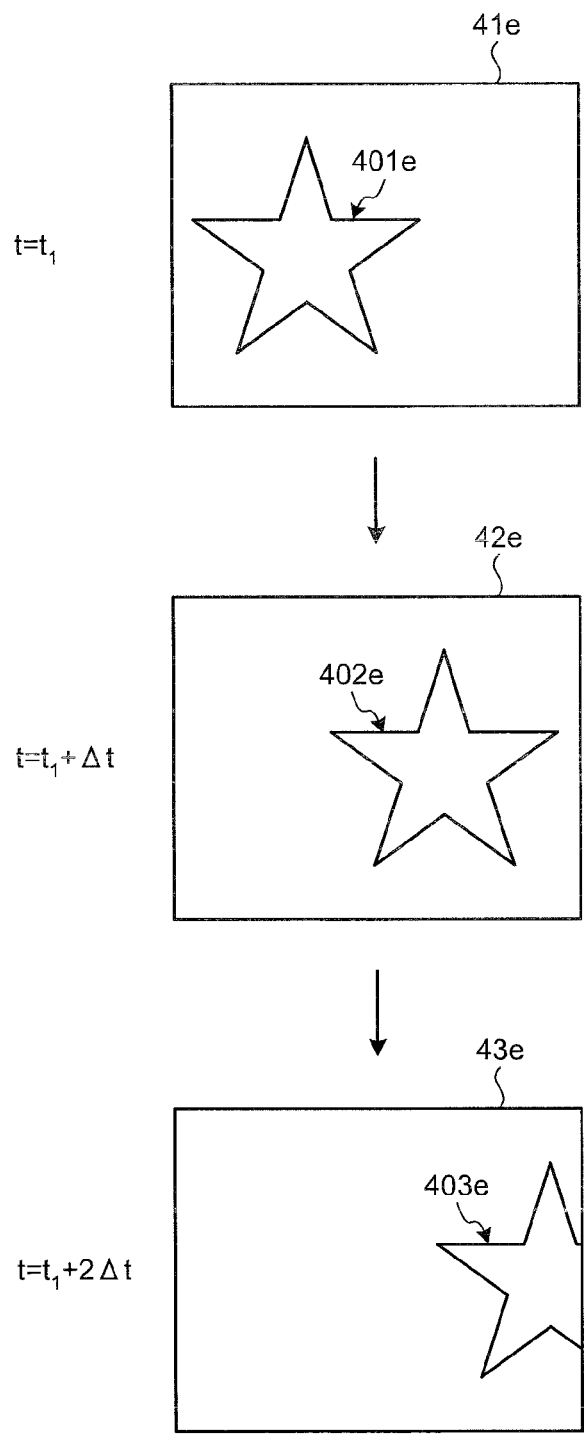
FIG. 4 is a diagram of example of display of edged images acquired by performing edging processing on the image sequence shown in FIG. 3.

FIG. 4 is a diagram of the feature values of the images 41 to 43 shown in FIG. 3 and an example of calculation of the change in the feature value. In FIG. 4, edged images acquired b performing edging processing on the objects 401, 402, and 403 contained respectively in the images 41, 42, and 43 shown in FIG. 3 are displayed. More specifically, an edge portion 401e of the object 401 is displayed in the edged image 41e, an edge portion 402e of the object 402 is displayed in the edged image 42e, and an edge portion 403e of the object 403 is displayed in the edged image 43e.

Provided that the feature value of an image is the area surrounded by an edge portion (hereinafter, referred to as "area of an edge portion"), while the area of the edge portion 401e, which is the feature value of the image 41, is equal to the area of the edge portion 402e, which is the feature value of the image 42, the area of the edge portion 403e that is the feature value of the image 43 is smaller than the areas of the edge portions 401e and 402e. Accordingly, the feature value change between the images 41 and 42 is smaller than the feature value change between the images 42 and 43. In this case, to extract the image 43 with the relatively large feature value change, it suffices that a configuration be taken in which an image with a relatively large feature value change from the previous image by a time interval $\Delta t$ is to be extracted.

When obtaining a change in the feature value between the images close to each other, instead of performing the processing for calculating the feature values of all images and then calculating the change in the feature value (the above-described processing of steps S102 to S103), loop computing processing in which processing for calculating a feature value and a change in the feature value on an image basis may be performed in the chronological order of the images. In other words, after a feature value of an image at a time t is calculated, a change in the feature value between the calculated feature value and the feature value (already calculated) of an image at $t-\Delta t$ earlier by one time interval may be obtained, and the result may be added to each image. When performing the loop computing processing as described above, the process goes to step S105 to be described below upon completion of the computing on all images.

At step S105, the image extracting unit 115 rearranges the images based on the changes in the feature value serving as an image change amount. For example, in the above case where the edge portion is regarded as the feature value, the images are rearranged in order from the one with a large feature value change. Subsequently, the image extracting unit 115 extracts a preset number of images according to the order of the rearranged image sequence (step S106). Thereafter, the image extracting unit 115 rearranges the images extracted at step S106 in a chronological order in which the images are taken, outputs information about the rearranged image sequence as extraction information, and stores the extraction information in the storage unit 102 (step S107).

Finally, based on the extraction information generated at step S107, information containing the extracted images are displayed on the display unit 103 (step S108).

Figure 5:
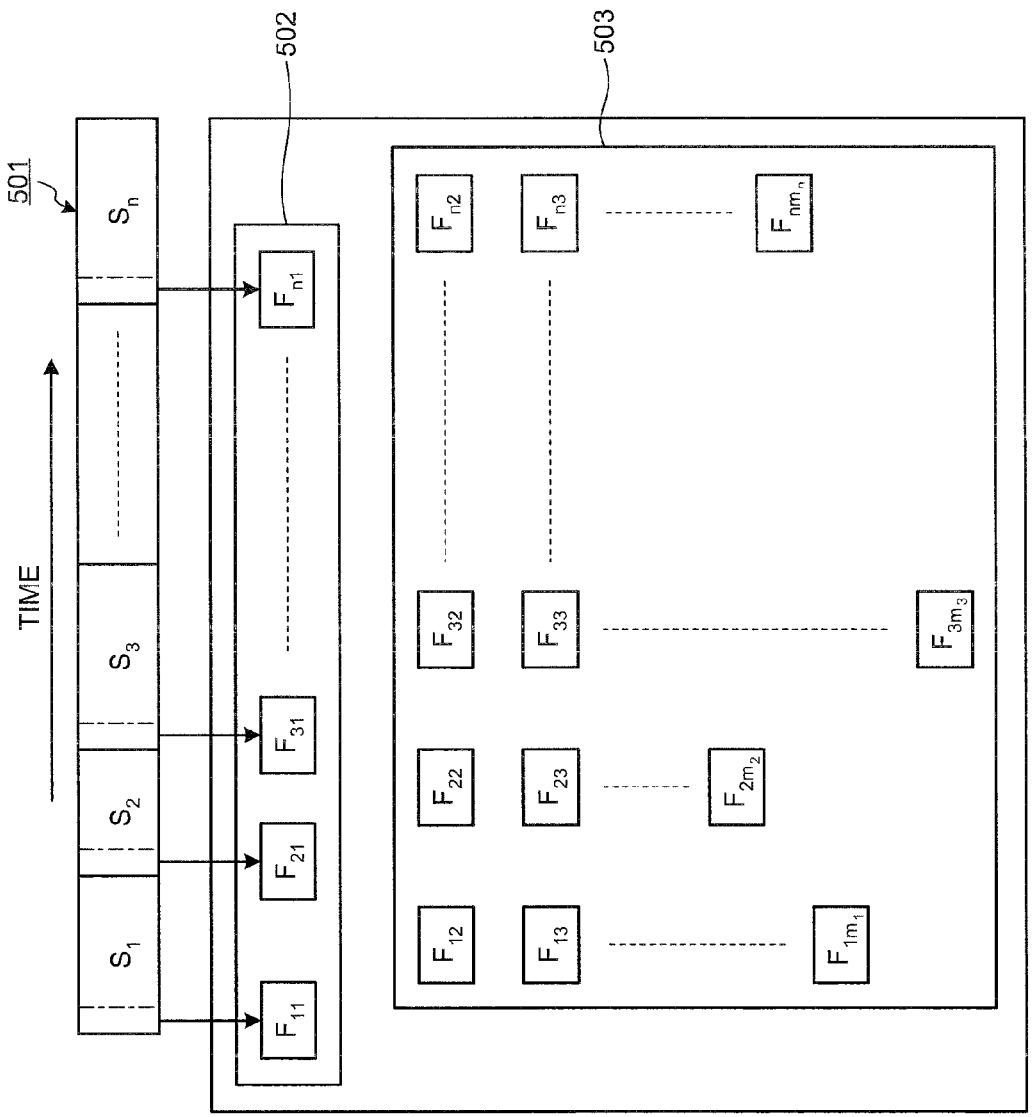
FIG. 5 is a schematic diagram of an outline of image extraction processing on a continuous image sequence.

FIG. 5 is a schematic diagram of an outline of the case where the above-described processing is performed on the continuous image sequence. As shown in FIG. 5, a continuous image sequence 501 is divided into a plurality of segments (n segments in FIG. 5). Each segment $S_i$ (i=1, 2, ..., n) consists of $m_i$ images $F_{ij}$ (j=1, 2, ..., $m_i$). The display unit 103 sequentially displays a scene change image group 502 obtained by rearranging chronologically-first images $F_{i1}$ (image at a position where a scene changes) of respective segments $S_i$ in the chronological order, and displaying an image group 503 consisting of non-extracted frames is omitted. Accordingly, displaying images with small image change amounts (change in the feature value) is omitted, which leads to efficient display.

In some cases, however, a first image $F_{i1}$ of a segment $S_i$ is not a valid scene depending on an object to be imaged or an imaging condition. In other words, there is a possibility that there is an image of a scene that is more valid than an image $F_{1j}$ in the segment $S_i$. Therefore, the image processing apparatus 1 may have a function of detecting a valid scene from a segment $S_i$. As a method of detecting a valid scene, for example, a method of determining an image quality such as brightness and a focusing state of an image can be applied.

In the above description, the case where a change in the feature value between two images close to each other is calculated as an image change amount. However, the image processing method according to the first embodiment is not limited to this case. For example, changes in the feature value among three or more images may be calculated, and a value obtained by performing predetermined statistical computing on the changes in the feature value is referred to on the rearrangement.

Figure 6:
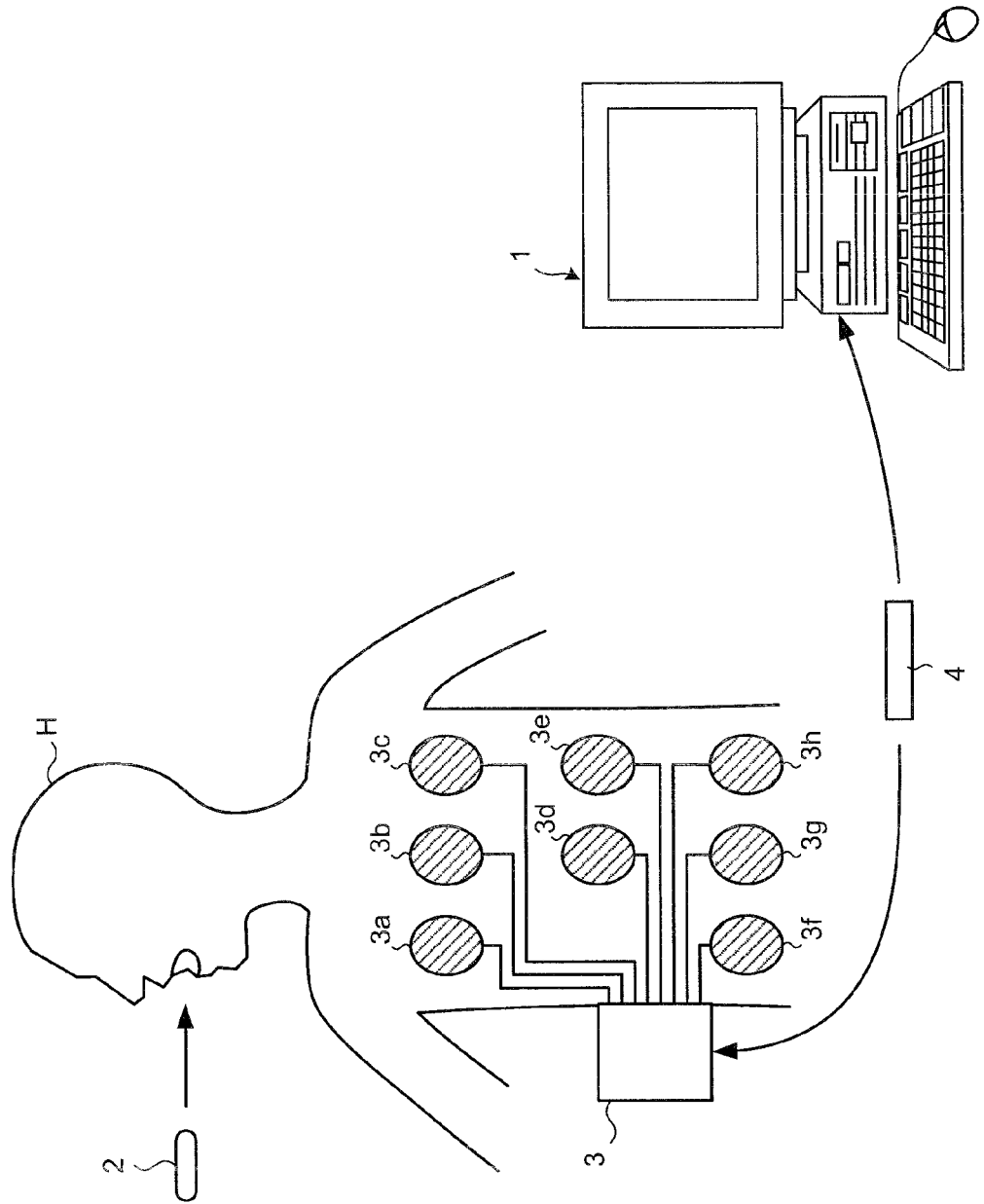
FIG. 6 is a schematic diagram of an example of a configuration of an in-vivo information acquiring system including the image processing apparatus according to the first embodiment of the present invention.

The first embodiment can be applied to a sequence of images (in-vivo image sequence) taken by a capsule endoscope. FIG. 6 is a schematic diagram of an example of a configuration of an in-vivo information acquiring system including the image processing apparatus 1. The in-vivo information acquiring system shown in FIG. 6 includes a capsule endoscope 2 that is introduced into body cavities of a subject H and taking body-cavity images; a receiving device 3 that receives a wireless signal transmitted from the capsule endoscope 2, and stores therein an image contained in the received wireless signal; and a portable recording medium 4 such as a memory card detachable from and insertable to the receiving device 3 or the image processing apparatus 1.

The capsule endoscope 2 has an imaging function for taking an in-vivo image of the subject H, and a wireless communication function for transmitting a wireless signal containing a taken image to the outside. More specifically, the capsule endoscope 2 takes in-vivo images of the subject H at predetermined time intervals of about 0.5 second (about 2 Hz), and transmits the taken in-vivo images to the receiving device 3 by predetermined radio waves.

A plurality of receiving antennas 3a to 3h that receive wireless signals transmitted from the capsule endoscope 2 are connected to the receiving device 3. The receiving antennas 3a to 3h are, for example, loop antennas and separately arranged on the body surface of the subject H corresponding to a path through which the capsule endoscope 2 passes. It suffices that at least one such receiving antenna is arranged on the subject H, and the number of antennas to be arranged is not limited to eight as shown in FIG. 6.

The receiving device 3 receives a wireless signal from the capsule endoscope 2 via any one of the receiving antennas 3a to 3h, and acquires image information about an in-vivo image of the subject H based on the received wireless signal. The image information acquired by the receiving device 3 is stored in the portable recording medium 4 inserted into the receiving device 3. The portable recording medium 4 that stores therein the image information about the in-vivo image of the subject H is inserted into the image processing apparatus 1 and used for the processing in the image processing apparatus 1.

In the in-vivo information acquiring system having the above configuration, the capsule endoscope 2 takes images while moving through the body cavities of the subject H for about 8 hours, so that a sequence of a large number of in-vivo images, i.e., about 60,000 images, are generated. However, there is a possibility that many similar images as scenes taken with the movement through the same body cavity are contained in the body cavity image sequence. Therefore, it is not realistic that a person observes all the images. Under such circumstances, has been desired in medical practice a technology that enables accurately extracting an image at which a scene changes in a short time. In the first embodiment, by appropriately omitting the images with small image change amounts from the sequence of a large number of in-vivo images taken by the capsule endoscope 2, redundancy of displaying similar images is reduced and the number of images to be displayed is minimized. As a result, desired images are accurately acquired, which leads to efficient diagnosis.

The above-descried first embodiment of the present invention can provide an image processing apparatus, an image processing method, and an image processing program that enables certainly detecting a set number of images in a short processing time by calculating a predetermined image change amount between at least two images from images constituting a continuous image sequence, and after information about the image change amount is added to a corresponding image, extracting a preset number of images from the image sequence based on the added information.

In addition, in the first embodiment, images can be extracted by processing easier than the conventional feature value calculating processing.

Furthermore, in the first embodiment, a redundant scene that merely appears for a long time is not detected as an important scene, and an image containing a scene accurately reflecting the change in quality between the images can be extracted. Accordingly, a technology favorable to the image processing on a sequence of in-vivo images taken by the capsule endoscope can be provided.

Furthermore, in the first embodiment, because an image with a large image change amount is extracted as an image containing a scene to be detected in consideration of the feature value, an image appropriate for observation can be certainly detected in consideration of the feature value.

Furthermore, in the first embodiment, because an image with a large image change amount is extracted as an image containing a scene to be detected in consideration of the feature value, an image appropriate for observation can be certainly detected in consideration of the feature value.

Modification

In the first embodiment, an amount other than the above-described feature value of an image may be used as an image change amount. For example, a normalized cross correlation may be used as an image change amount, or similarity such as an SSD (sum of squared difference of corresponding pixel components) or such as an SAD (sum of absolute difference of corresponding pixel components) may be used as an image change amount. Alternatively, an SSD or an SAD obtained as a result of multiplying or dividing a total pixel value of the image by an average pixel value may be used as an image change amount. Alternatively, an SSD or an SAD obtained as a result of multiplying or dividing a total pixel value of each part of a divided image by an average pixel value of each part of the divided image may be used as an image change amount. Furthermore, points regularly selected (for example, at constant intervals) in a space, or a feature point at which a characteristic is locally large may be calculated, and the amount of movement of such a point or the magnitude (absolute value) of an optical flow may be used as an image change amount.

Because the image change amounts mentioned above lead to a change different in quality from that in the case where the area of a figure formed by an edge portion serves as a feature value and a change in the feature value is calculated, images of scenes with different tendency can be extracted. In this sense, various types of amounts can be applied to the image change amount depending on the characteristics of images to be processed.

Figure 7:
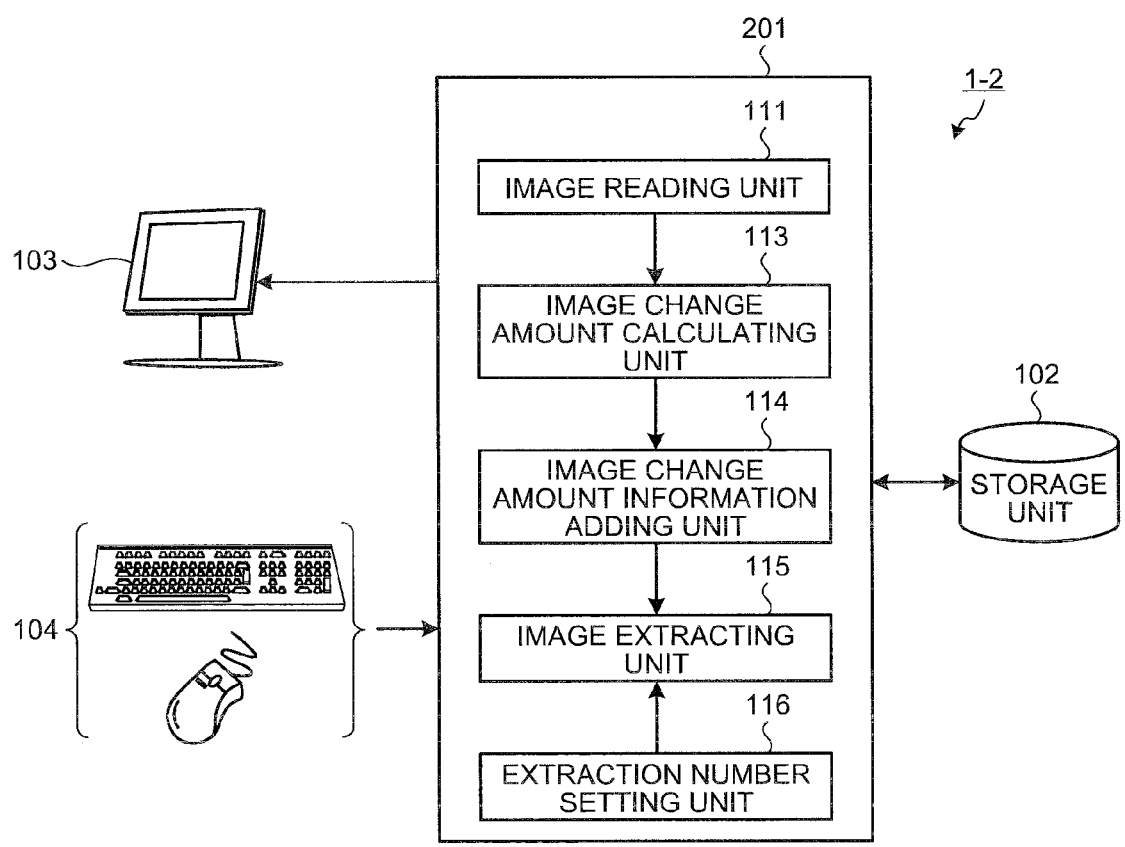
FIG. 7 is a diagram of a configuration of an image processing apparatus according to a modification of the first embodiment of the present invention.

FIG. 7 is a diagram of a configuration of an image processing apparatus according to a modification of the first embodiment. Specifically, FIG. 7 is a diagram of a configuration of an image processing apparatus in the case where an image change amount is obtained without performing the feature value calculating processing. In an image processing apparatus 1-2 shown in FIG. 7, a computing unit 201 having a computing function and a controlling function does not include a feature value calculating unit. Except for this, the configuration of the image processing apparatus 1-2 is the same as that of the image processing apparatus 1. Therefore, in FIG. 7, the same units as those of the image processing apparatus 1 are denoted by the same reference numerals of the image processing apparatus 1.

Figure 8:
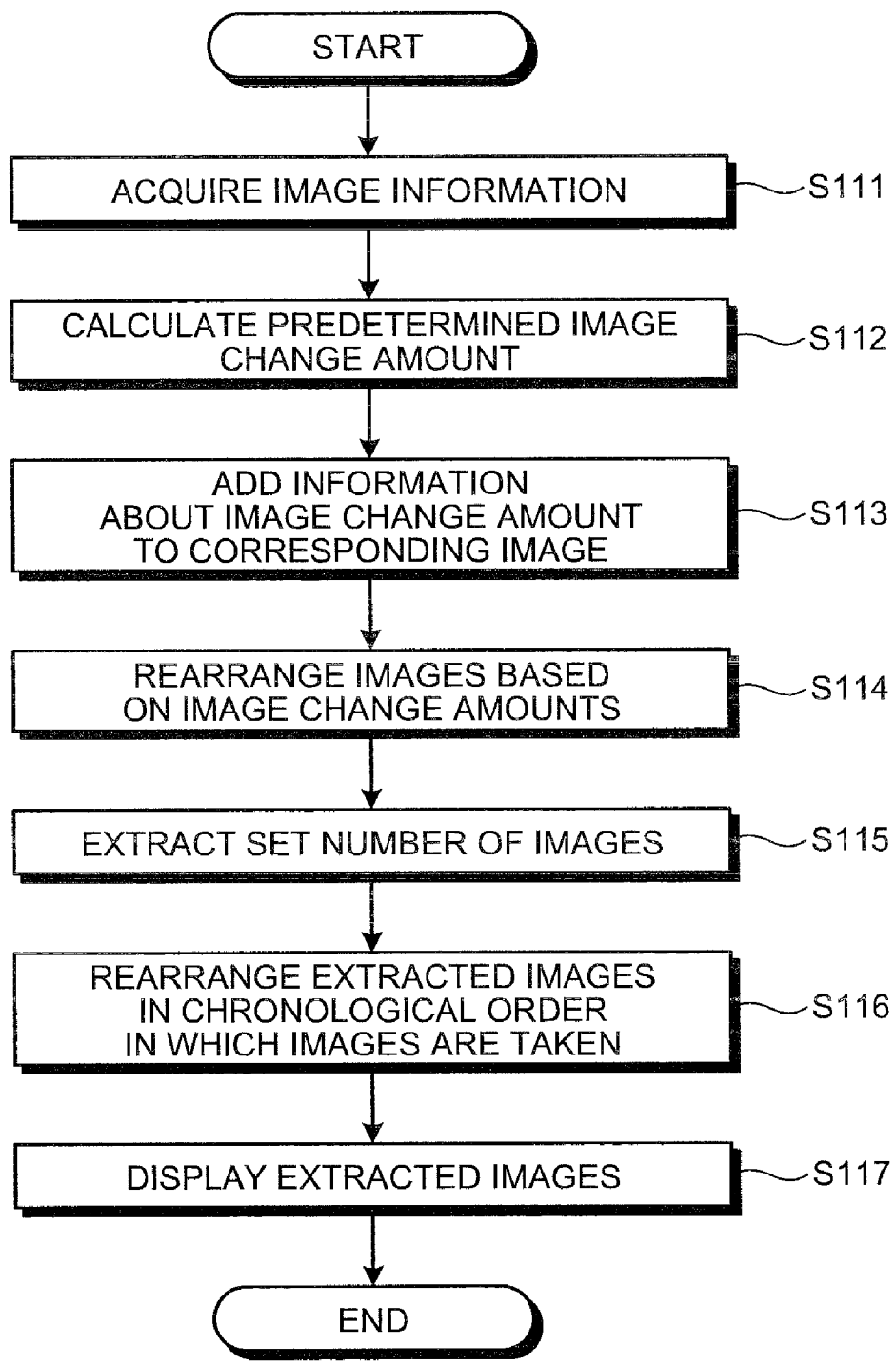
FIG. 8 is a flowchart of an outline of processing of an image processing method according to a modification of the first embodiment of the present invention.

FIG. 8 is a flowchart of an outline of an outline of an image processing method performed by the image processing apparatus 1-2. In the image processing apparatus 1-2, after the image reading unit 111 acquires image information from the storage unit 102 (step S111), the image change amount calculating unit 113 calculates a predetermined image change amount (step S112). The image change amount is an amount that can be acquired without calculating a feature value, and any one of the above-described amounts defined based on a correlation, difference, similarity, and the like can be applied. The processes of steps S113 to S117 after calculation of an image change amount correspond to the processes of steps S104 to S108 of the image processing method according to the first embodiment.

According to the modification of the first embodiment explained above, the same effect as that of the first embodiment can be obtained.

Furthermore, in the modification of the first embodiment, because a correlation, a difference or similarity between images chronologically apart from each other at predetermined time intervals is used, the image change amount can be detected highly accurately.

Second Embodiment

Figure 9:
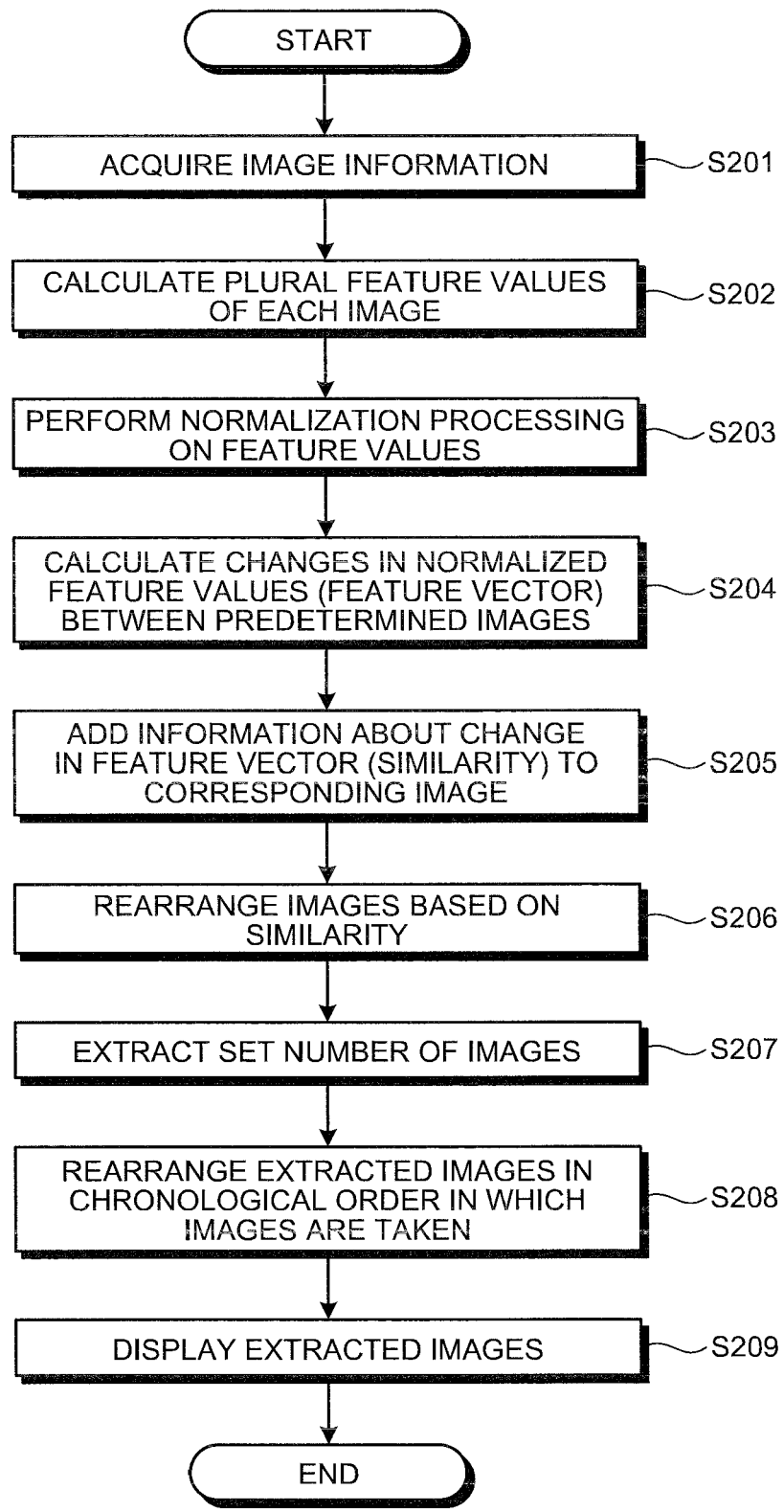
FIG. 9 is a flowchart of an outline of processing of an image processing method according to a second embodiment of the present invention.

FIG. 9 is a flowchart of an outline of processing of an image processing method according to a second embodiment of the present invention. In the second embodiment, an image at a position where a scene changes is extracted using a plurality of different types of feature values. An image processing apparatus according to the second embodiment has the same configuration as that of the image processing apparatus 1 described above.

First, the image reading unit 111 reads and acquires information such as a total number of images constituting an image sequence and an image size from the storage unit 102 (step S201). Thereafter, the feature value calculating unit 112 calculates a plurality of feature values for each image (step S202). In the descriptions below, the number of feature values is M (M is an integer not smaller than 2), and the number of images constituting an image sequence is N (N is an integer not smaller than 2). Image information about the images constituting the image sequence is $I_1, I_2, \ldots, I_N$ in a chronological order in which the images are taken. When a p-th feature value calculated for a q-th image is denoted by $F_{qp}$, all the feature values calculated at step S202 are collected as a feature value matrix F represented by Equation (1).

$$F = \begin{pmatrix} F_{11} & F_{12} & \ldots & F_{1p} & \ldots & F_{1M} \\ F_{21} & \ddots & & \vdots & & \vdots \\ \vdots & & \ddots & \vdots & & \vdots \\ F_{q1} & \ldots & \ldots & F_{qp} & & \vdots \\ \vdots & & & & \ddots & \vdots \\ F_{N1} & \ldots & \ldots & \ldots & \ldots & F_{NM} \end{pmatrix} \quad (1)$$

When a plurality of different types of feature values are used, the magnitudes of the respective feature values are not the same. For this reason, if a vector composed of only feature values is constituted, and when threshold processing is performed on the level of the vector, the influence of a feature value in a relatively large value is dominant and the influence of a feature value in a relatively small value is not reflected. For this reason, in the second embodiment, the feature value calculating unit 112 performs a normalization process on the feature values calculated at step S202, and generates a feature vector composed of values obtained by the normalization process (step S203).

Specifically, a feature vector $\vec{f}_q$ of image information Iq is given by the following Equation (2).

$$\vec{f}_q = \sum_{j=1}^{M} w_j \cdot \{\kappa_j \cdot (F_{qj} - \overline{F}_j)\} \cdot \vec{i}_j \quad (2)$$

where a unit vector $$\vec{i}_p (p = 1, 2, \ldots, M)$$

satisfies $\forall p, p'(p \neq p'; p'=1, 2, \ldots, M)$;

$$\vec{i}_p \perp \vec{i}_{p'}.$$

In Equation (2), weighing factors of each dimension are $w_1$, to $w_M$.

Furthermore, an (image) average $\overline{F}_p$ of feature values and a normalization factor $\kappa_p$ are given respectively by the following Equations (3) and (4).

$$\overline{F}_p = \frac{1}{N} \sum_{j=1}^{N} F_{jp} \quad (3)$$

$$\kappa_p = \left\{ \frac{1}{N} \sum_{j=1}^{1} (F_{jp} - \overline{F}_p)^2 \right\}^{-1/2} \quad (4)$$

$$= \frac{1}{\sigma_p}$$

$$= \frac{1}{\sqrt{v_p}}$$

where $\sigma_p$ is a standard deviation and $v_p$ is a variance.

Thereafter, the image change amount calculating unit 113 calculates changes in the normalized feature values (feature vector) between predetermined images (step S204). The change in the feature vector to be calculated is the integrated change amount acquired by combining the changes in the respective feature values.

Subsequently, the image change amount information adding unit 114 adds information about the change in the feature value to a corresponding image (step S205). Hereinafter, the case where similarity between images is used as information about changes in feature values is explained below.

Similarity of image information $I_p$ to image information $I_{p'}$ is defined by the following Equation (5), using feature vectors $\vec{f}_p$ and $\vec{f}_{p'}$.

$$\text{Sim}_{pp'} = \|\vec{f}_p - \vec{f}_{p'}\| \tag{5}$$

In this definition, the higher the level of similarity is, the smaller the value of $\text{Sim}_{pp'}$ is. In the second embodiment, as similarity between the image information $I_p$ and image information $I_{p-1}$ chronologically close to each other, $$\text{Sim}_{pp-1} = \|\vec{f}_p - \vec{f}_{p-1}\| \tag{6}$$

is calculated.

Subsequently, the image extracting unit 115 rearranges the images using the similarity $\text{Sim}_{pp-1}$ calculated at step S205 (step S206). Thereafter, the image extracting unit 115 extracts a preset number of images in order from an image with a small value of the similarity $\text{Sim}_{pp-1}$ added at step S205 (step S207). The images extracted at step S206 are rearranged in the chronological order in which the images are taken, and information about the rearrange image sequence is output as extraction information and stored in the storage unit 102 (step S208).

Finally, based on the extraction information generated at step S208, information containing the extracted images are displayed on the display unit 103 (step S209).

According to the second embodiment of the present invention, as in the case of the first embodiment, an image processing apparatus, am image processing method, and an image processing program that enables certainly detecting a set number of images in a short processing time.

Furthermore, according to the second embodiment, by calculating a plurality of different types of feature values, scene detection applicable to various cases can be performed.

Furthermore, according to the second embodiment, by performing the normalization process on different types of feature values, scene detection reflecting characteristics of each feature value can be performed.

Third Embodiment

Figure 10:
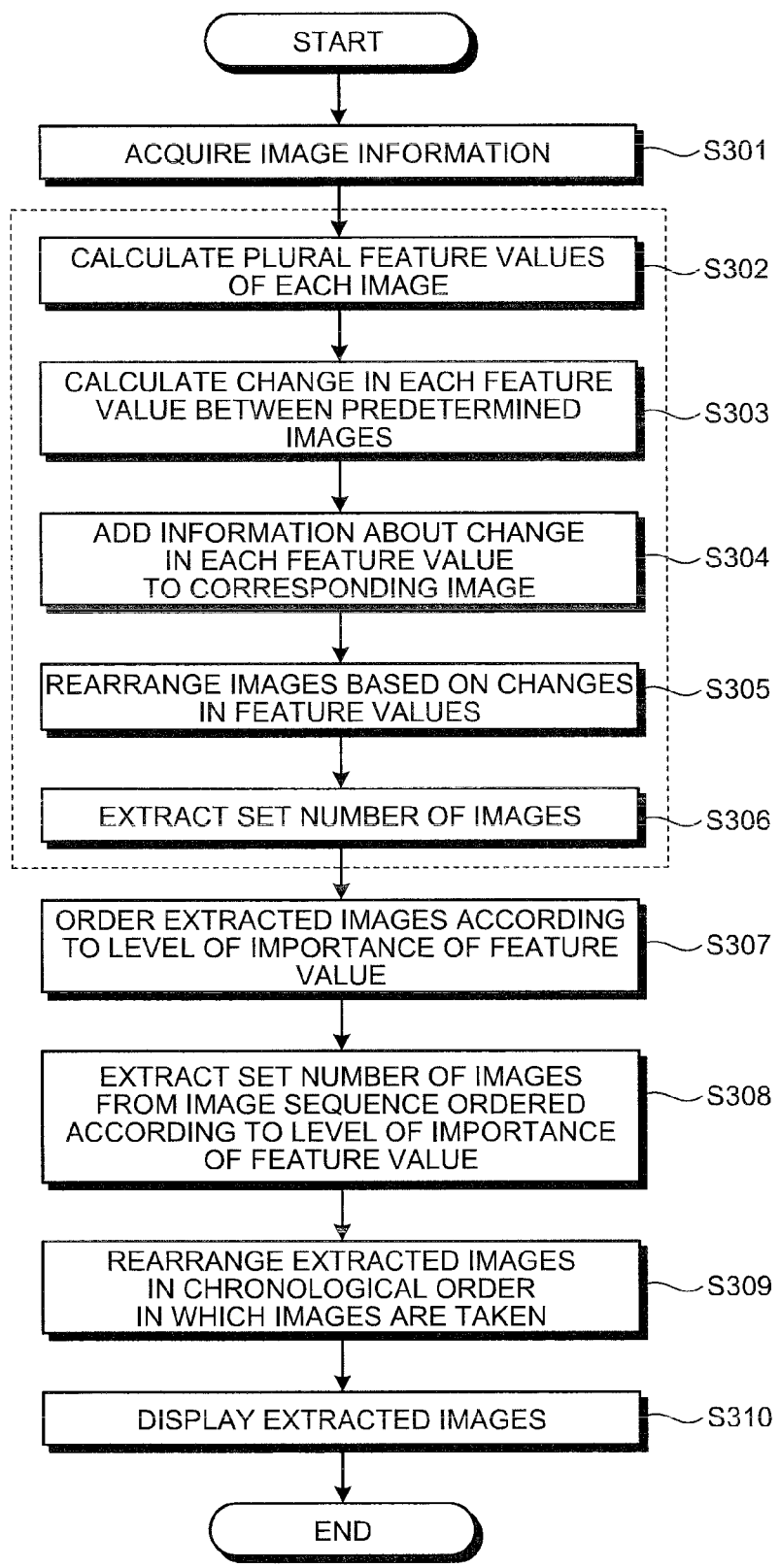
FIG. 10 is a flowchart of an outline of processing of an image processing method according to a third embodiment of the present invention.

FIG. 10 is a flowchart of an outline of processing of an image processing method according to a third embodiment of the present invention. In the third embodiment, a change in each of a plurality of different types of feature values is obtained. After a predetermined number of images are extracted for each feature value, the extracted images are ordered according to a levels of importance added to each of the feature values, and images are re-extracted from the ordered image sequence. An image processing apparatus according to the third embodiment has the same configuration as that of the image processing apparatus 1 described above.

First, the image reading unit 111 reads and acquires information such as a total number of images constituting an image sequence and an image size from the storage unit 102 (step S301). Thereafter, the feature value calculating unit 112 calculates a plurality of feature values of each image (step S302). Subsequently, the image change amount calculating unit 113 calculates a change in each of the feature values between predetermined images (step S303), and the image change amount information adding unit 114 adds information about the changes in the feature value to corresponding images (step S304). Subsequently, the images are rearranged based on the change in each of the feature values (step S305), and a set number of images are extracted (step S306). The processing from steps S302 to S306 (processes of an area surrounded by the dotted line shown in FIG. 10) may be performed as loop computing process for each feature value.

At step S306, a preset number of images are independently extracted for each feature value (the number of images to be extracted is generally equal not depending on the feature value). Therefore, there is a possibility that the images to be extracted for each feature value include some images that are to be redundantly extracted based on a plurality of feature values. For this reason, it is preferable that the number of images to be finally extracted through the processing explained below be set smaller than the total number of images to be extracted when step S306 is completed.

At the subsequent step S307, the image extracting unit 115 orders the extracted images according to the level of the feature value. Specifically, after the images extracted at step S306 with the feature value at the highest level are arranged in the order in which the images are arranged, the images extracted at step S306 with the feature value at the second highest level are arranged in the order in which the images are arranged. Thereafter, ordering the extracted images from an image with a feature value at a higher level is carried out. The ordering is performed while the order of the extraction for each feature value at step S306 is maintained. The levels of importance of the feature values to be referred to at step S307 may be previously set or set by a user via the input unit 104 in each time. In both of the cases, in the third embodiment, the process for obtaining the levels of importance of feature values is not performed.

Subsequently, the image extracting unit 115 extracts images of the number to be finally extracted from the image sequence ordered according to the level of importance at step S307 (step S308). Specifically, images with the feature value at the lowest level of importance are deleted from the last image in the image sequence rearranged at step S306. At this step, if the similarity $\text{Sim}_{pq}$ represented in Equation (5) is adopted as a change in a feature value of the image, it suffices that images be sequentially deleted from an image added with a large value of similarity $\text{Sim}_{pq}$. If more images than those to be finally extracted are left even after all images with the feature value at the lowest level of importance are deleted, the same processing is performed regarding the feature value at the next lowest level of importance to delete images to the number of images to be finally extracted. As the method of deleting images at step S308, various methods other than that described above can be adopted, and images can be deleted in an appropriate computing process based on the similarity of over-extracted images and an arrangement order.

Thereafter, the image extracting unit 115 rearranges the images extracted at step S308 in the chronological order in which the images are taken, outputs information about the rearranged image sequence as extraction information, and stores the extraction information in the storage unit 102 (step S309).

Finally, based on the extraction information generated at step S309, information containing the extracted images is displayed on the display unit 103 (step S310).

According to the third embodiment of the present invention, as in the case of the first embodiment, it is possible to provide an image processing apparatus, an image processing method, and an image processing program that enable certainly detecting a set number of images in a short processing time.

According to the third embodiment, by extracting images in consideration of the levels of importance of the feature values, unfair extraction of images with a specific characteristic or redundant extraction of the same image can be reduced.

As the best modes for carrying out the present invention, the first to the third embodiments are described in detail above. However, the present invention is not limited to those embodiments.

For example, if extracted images include an image to be not easily observed even when displayed, the images cannot be easily read. For example, when diagnosis is performed using such inappropriate images, the efficiency in diagnosing may be lowered. For this reason, the image extracting unit may determine whether each image is inappropriate as an image to be extracted based on the feature value calculated by the feature value calculating unit. When it is an inappropriate image, images are extracted excluding the image. This helps the image extracting unit not to extract the image to be observed not easily, so that such images are not displayed. Accordingly, in diagnosing using extracted images, efficiency in diagnosing can be prevented from lowering. As used herein, "inappropriate image" as an image to be extracted means an image that is not easily observed even when displayed.

A statistical amount (for example, average value) of pixel values can be adopted as a feature value representing a characteristic of the above inappropriate image. In this case, when the statistical amount of pixel values calculated as a feature value by the feature value calculating unit is larger than a predetermined threshold, the image extracting unit determines that the image is an inappropriate image because it is too bright, and excludes the image from images to be extracted. On the other hand, when a statistical amount of pixel values calculated by the feature value calculating unit is smaller than a predetermined threshold, the image extracting unit determines that the image is an image not to be easily observed because it is too dark, and excludes the image from images to be extracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for extracting images from a continuous image sequence, the image processing apparatus comprising:
   a storage unit that stores image information about images constituting the image sequence;
   an image reading unit that reads the image information from the storage unit;
   an image change amount calculating unit that calculates a predetermined image change amount between at least two images using the image information read by the image reading unit;
   an image change amount information adding unit that adds information about the image change amount calculated by the image change amount calculating unit to a corresponding image; and
   an image extracting unit that extracts a preset number of images from the image sequence based on the information added to each image by the image change amount information adding unit, wherein the image extracting unit rearranges the images based on the information added to each image by the image change amount information adding unit, and extracts images from the image sequence, using a result of the rearranging.

2. The image processing apparatus according to claim 1, wherein the image extracting unit rearranges the images extracted from the image sequence in a chronological order in which the images are taken.

3. The image processing apparatus according to claim 1, further comprising
   a feature value calculating unit that calculates a feature value of each image contained in the image information read by the image reading unit, wherein
   the image change amount calculating unit calculates, as an image change amount, a change in the feature value between at least two images, using the feature value of each image calculated by the feature value calculating unit.

4. The image processing apparatus according to claim 3, wherein
   the feature value calculating unit calculates a plurality of different types of feature values of each image,
   the image change amount calculating unit calculates, after calculating a change in each feature value, an integrated change amount obtained by combining results of the calculating, and
   the image change amount information adding unit adds, as information about the changes in the feature values, information obtained using the integrated change amount to each image.

5. The image processing apparatus according to claim 4, wherein
   the feature value calculating unit performs a normalization process on the feature values, and generates a feature vector composed of values obtained by the normalization process, and
   the image change amount calculating unit calculates, as the integrated change amount, a change in the feature vector between predetermined images.

6. The image processing apparatus according to claim 3, wherein
   the feature value calculating unit calculates a plurality of different types of feature values of each image, and
   the image extracting unit extracts, after extracting a preset number of images from the image sequence based on the information added to each image, images based on a level of importance added to each of the feature values.

7. The image processing apparatus according to claim 3, wherein
   any one of the feature values indicates the number of pixels of an image binarized with a predetermined threshold after an edge of the image is extracted.

8. The image processing apparatus according to claim 1, further comprising
   a feature value calculating unit that calculates a feature value of an image contained in the image information read by the image reading unit, wherein
   the image extracting unit extracts a preset number of images based on the feature value of each image calculated by the feature value calculating unit and the information added to each image by the image change amount information adding unit.

9. The image processing apparatus according to claim 8, wherein
   the image feature value calculating unit calculates at least a statistical amount of pixel values of each image as the feature value, and
   the image extracting unit extracts the preset number of images based on the information added to each image by the image change amount information adding unit, while excluding an image about which it is determined that the image is inappropriate as an image to be extracted based on the statistical amount of pixel values of each image calculated by the feature value calculating unit.

10. The image processing apparatus according to claim 9, wherein the image extracting unit extracts the preset number of images, while excluding an image about which it is determined that a statistical amount of pixel values of the image calculated by the feature value calculating unit is larger than a predetermined threshold and the image is too bright as an image to be extracted.

11. The image processing apparatus according to claim 9, wherein the image extracting unit extracts the preset number of images, while excluding an image about which it is determined that a statistical amount of pixel values of each image calculated by the feature value calculating unit is smaller than a predetermined threshold and the image is too dark as an image to be extracted.

12. The image processing apparatus according to claim 1, wherein the image change amount calculating unit calculates, as the image change amount, a correlation, a difference, or similarity between at least two images.

13. The image processing apparatus according to claim 1, wherein the image change amount calculating unit calculates the image change amount using a predetermined number of images at preset time intervals.

14. The image processing apparatus according to claim 1, wherein the image sequence is a sequence of in-vivo images taken by a capsule endoscope that is introduced into body cavities of a subject.

15. The image processing apparatus according to claim 1, further comprising an extraction number setting unit that sets the number of images to be extracted by the image extracting unit.

16. An image processing apparatus for extracting images from a continuous image sequence, the image processing apparatus comprising:
   a storage unit that stores image information about images constituting the image sequence;
   an image reading unit that reads the image information from the storage unit;
   an image change amount calculating unit that calculates a predetermined image change amount between at least two images using the image information read by the image reading unit;
   an image change amount information adding unit that adds information about the image change amount calculated by the image change amount calculating unit to a corresponding image;
   a feature value calculating unit that calculates at least a statistical amount of pixel values as a feature value of each image contained in the image information read by the image reading unit; and
   an image extracting unit that extracts an image from the image sequence based on the feature value of each image calculated by the feature value calculating unit and the information added to each image by the image change amount information adding unit, wherein
   the image extracting unit extracts an image based on the information added to each image by the image change amount information adding unit, while excluding an image about which it is determined that the image is inappropriate as an image to be extracted based on the statistical amount of pixel values of each image calculated by the feature value calculating unit.

17. The image processing apparatus according to claim 16, wherein
   the image extracting unit extracts images, while excluding an image about which it is determined that a statistical amount of pixel values of each image calculated by the feature value calculating unit is larger than a predetermined threshold and the image is too bright as an image to be extracted.

18. The image processing apparatus according to claim 16, wherein the image extracting unit extracts images, while excluding an image about which it is determined that a statistical amount of pixel values of each image calculated by the feature value calculating unit is smaller than a predetermined threshold and the image is too dark as an image to be extracted.

19. The image processing apparatus according to claim 16, wherein the image change amount calculating unit calculates, as the image change amount, a correlation, a difference, or similarity between at least two images.

20. The image processing apparatus according to claim 16, wherein the image change amount calculating unit calculates the image change amount using a predetermined number of images at preset time intervals.

21. The image processing apparatus according to claim 16, wherein the image sequence is a sequence of in-vivo images taken by a capsule endoscope that is introduced into body cavities of a subject.

22. The image processing apparatus according to claim 16, further comprising an extraction number setting unit that sets the number of images to be extracted by the image extracting unit.

23. An image processing method performed by a computer that enables extracting images from a continuous image sequence and includes a storage unit which stores image information about images constituting the image sequence, the image processing method comprising:
   reading the image information from the storage unit;
   calculating a predetermined image change amount between at least two images using the read image information;
   adding information about the calculated image change amount to a corresponding image;
   extracting a preset number of images from the image sequence based on the information added to each image; and
   rearranging the images based on the information added to each image by the adding information step, and extracting images from the image sequence, using a result of the rearranging.

24. A computer readable storage device having a computer program product including programmed instructions, wherein the instructions, when executed by a computer that enables extracting images from a continuous image sequence and includes a storage unit which stores image information about images constituting the image sequence, cause the computer to perform:
   reading the image information from the storage unit;
   calculating a predetermined image change amount between at least two images using the read image information;
   adding information about the calculated image change amount to a corresponding image;
   extracting a preset number of images from the image sequence based on the information added to each image; and
   rearranging the images based on the information added to each image by the adding information step, and extracting images from the image sequence, using a result of the rearranging.

* * * * *